(12) United States Patent
Bauduin et al.

(10) Patent No.: US 8,683,935 B2
(45) Date of Patent: Apr. 1, 2014

(54) DISCONNECTABLE CHAIN CONNECTOR (75) Inventors: Christian Raymond Bauduin, Eze (FR); Jean Braud, La Turbie (FR); Jean Pierre Benoit, Cagnes sur Mer (FR)

(73) Assignee: Single Buoy Moorings, Inc., Marly (CH)

( * ) Notice: Subject to any disclaimer, the term of this patent is extended or adjusted under 35 U.S.C. 154(b) by 0 days.

(21) Appl. No.: 13/262,435

(22) PCT Filed: Apr. 2, 2010

(86) PCT No.: PCT/EP2010/054461
§ 371 (c)(1),
(2), (4) Date: Sep. 30, 2011

(87) PCT Pub. No.: WO2010/112603
PCT Pub. Date: Oct. 7, 2010

(65) Prior Publication Data
US 2012/0031320 A1 Feb. 9, 2012

(30) Foreign Application Priority Data

Apr. 2, 2009 (EP) .................................. 09157218

(51) Int. Cl.
*B63B 21/00* (2006.01)
(52) U.S. Cl.
USPC ............. 114/230.1; 114/230.26; 114/221 R; 405/169; 405/223.1; 405/224; 405/215
(58) Field of Classification Search
USPC .............................. 114/230.1, 230.2; 405/169
See application file for complete search history.

(56) References Cited

U.S. PATENT DOCUMENTS

| | | | | | |
|---|---|---|---|---|---|
| 4,580,636 A | * | 4/1986 | Johnson et al. | ............... | 166/343 |
| 4,620,818 A | * | 11/1986 | Langner | ..................... | 405/169 |
| 4,676,696 A | * | 6/1987 | Laursen | ..................... | 405/169 |
| 4,943,188 A | * | 7/1990 | Peppel | ..................... | 405/223.1 |
| 5,947,642 A | * | 9/1999 | Teixeira et al. | ............ | 405/195.1 |
| 6,085,681 A | * | 7/2000 | Morton | ..................... | 114/221 R |

(Continued)

FOREIGN PATENT DOCUMENTS

| | | | | |
|---|---|---|---|---|
| FR | 2794100 A1 | * | 12/2000 | ............. B63H 9/08 |
| GB | 2 178 101 A | | 2/1987 | |
| WO | 2008/074930 A1 | | 6/2008 | |
| WO | 2009/156639 A1 | | 12/2009 | |

OTHER PUBLICATIONS

International Search Report, dated Aug. 3, 2010, from corresponding PCT application.

*Primary Examiner* — Lars A Olson
*Assistant Examiner* — Jovon Hayes
(74) *Attorney, Agent, or Firm* — Young & Thompson (57) ABSTRACT

A mooring leg connector for use with a mooring leg extending up from the sea floor to connect a floating structure to be moored to the seabed wherein disconnection and connection of the mooring leg is done by pulling in and out a connector elongated body extending in the mooring leg direction. The connector has a latch mechanism for fixation of the mooring leg to the floating structure to be moored and preventing movement in the direction of the seabed, and a flexible part with a double articulation axis located at the bottom of the connector body above the attachment member, the connector body being received in a housing which is fixed to a part of the structure to be moored, wherein the latch mechanism includes guiding elements and followers or orientation pins between the body of the connector and the housing.

10 Claims, 10 Drawing Sheets

(56) References Cited

U.S. PATENT DOCUMENTS

| | | | |
|---|---|---|---|
| 6,112,691 A * | 9/2000 | Bajeli et al. | 114/230.1 |
| 6,158,374 A * | 12/2000 | Free, Jr. | 114/215 |
| 6,363,876 B1 * | 4/2002 | Blake | 114/230.1 |
| 6,409,428 B1 * | 6/2002 | Moog | 405/169 |
| 6,540,426 B2 * | 4/2003 | Cloyd et al. | 403/122 |
| 6,558,084 B2 * | 5/2003 | Moog et al. | 405/224 |
| 6,663,320 B1 | 12/2003 | Braud et al. | |
| 8,342,116 B1 * | 1/2013 | Cardarelli et al. | 114/230.26 |
| 2006/0070741 A1 | 4/2006 | Pollack et al. | |
| 2006/0086303 A1 * | 4/2006 | Palmquist | 114/230.1 |
| 2006/0213418 A1 * | 9/2006 | Boatman et al. | 114/230.1 |
| 2011/0162747 A1 | 7/2011 | Routeau et al. | |
| 2012/0031320 A1 * | 2/2012 | Bauduin et al. | 114/264 |

* cited by examiner

Fig 6g

DISCONNECTABLE CHAIN CONNECTOR

FIELD OF THE INVENTION

The present invention relates to a mooring leg connector for use with a mooring leg extending up from the sea floor to connect a floating structure to be moored to the seabed wherein disconnection and connection of the mooring leg is done by pulling in and out the connector elongated body extending in the mooring leg direction, the connector having a latch mechanism for fixation of the mooring leg to the floating structure to be moored and preventing movement in the direction of the seabed, and a flexible part with a double articulation axis located at the bottom of the connector body above the attachment member, the connector being received in a housing which is fixed to a part of the structure to be moored.

The present invention also relates to methods for locking and unlocking a mooring leg connector to a floating structure to be moored to the seabed, said connector having an elongated body extending in the mooring leg direction and a latch mechanism for fixation of the mooring leg to the floating structure to be moored and preventing movement in the direction of the seabed.

BACKGROUND OF THE INVENTION

In U.S. Pat. No. 6,663,320 (filed by the applicant), there is disclosed a anchor line connector to connect an anchor line to a floating body, the connector comprising a housing having two mutually perpendicular pivot axis, a flexible top part and a latch mechanism for allowing movement of the anchor line towards the floating body.

The solution described in this patent concerns a pivoting connector that can pivot around an axis such that the mooring lines can move in radial plane but that can also pivot around another axis perpendicular to the first one. Hence the bending fatigue in the chain part is limited and fatigue failure in transversely oriented links is prevented.

However the fatigue failure and wear can further be optimized by having the tubular member fixed and the connection means decoupled from the pivoting means.

U.S. Pat. No. 4,943,188 discloses a tether connector that includes a first member secured to the sea floor and a second member secured to the lower end of the tether. A ring having a central vertical axis and with horizontal lugs is provided. A cylindrical receptacle also having a central vertical axis and including a primary guide, a vertical slot, a secondary guide and a notch is provided. The ring and receptacle are mounted on the members to permit relative rotation between the ring and receptacle about the central axis of the tendon. The solution proposed aims at securing tethers to a sea floor receptacle mechanism, these solutions are not ideal as inspection of the articulation in dry environment are not possible without disconnecting, further maintenance operation are not eased.

The present invention proposes a solution which would enable to have a chain connector that can accommodate any type of mooring leg. The main advantages of the system according to the present invention are the ability to be operated without the need for divers, both during connection and disconnection. This chain connector can be easily disconnected with a simple pulling operation, and can be brought on the deck of a supply vessel. This feature allows an easy inspection of the articulation in dry condition without the need to disconnect. The chain can be retensioned, by cutting off excess chain links. Furthermore, on the supply vessel deck the parts that may have been affected by wear can be eventually replaced. The overall size and weight are reduced with respect to standard connectors allowing therefore reduction of the buoyancy requirements of the moored floating structure

SUMMARY OF THE INVENTION

The invention provides a mooring leg connector for use with a mooring leg extending up from the sea floor to connect a floating structure to be moored to the seabed wherein disconnection and connection of the mooring leg is done by pulling in and out the connector elongated body extending in the mooring leg direction, the connector having a latch mechanism for fixation of the mooring leg to the floating structure to be moored and preventing movement in the direction of the seabed, and a flexible part with a double articulation axis located at the bottom of the connector body above the attachment member, the connector being received in a housing which is fixed to a part of the structure to be moored, the latch mechanism comprising a system of cam or guiding means and followers or orientation pins between the rod of the connector and the housing. Another object of the invention is to provide a mooring leg connector for use with a mooring leg that has an upper portion with an axis, where the chain extends up from the sea floor, to connect the bottom of a turret integrated into or attached to the hull of a floating structure to be moored to the seabed, said connector having an elongated body extending in the mooring leg direction and a latch mechanism for fixation of the mooring leg to the floating structure to be moored and preventing movement in the direction of the seabed, the connector being received in a housing which is integral (or at least rigidly connected) to a part of the structure to be moored, wherein the connector comprises a flexible part with a double articulation axis located at the bottom of the connector body above the attachment member and wherein the latch mechanism is a system made by cam (or guiding member) and followers (or orientation pins) between the rod of the connector and the housing.

According to the present invention the connector comprises a rod provided with at least one pin that will enter a guiding member integrated inside the housing to rotate the rod inside the housing into a proper alignment and lock the connector.

The present invention also provides a method for locking a mooring leg connector to a floating structure to be moored to the seabed, said connector having an elongated body extending in the mooring leg direction and a latch mechanism for fixation of the mooring leg to the floating structure to be moored and preventing movement in the direction of the seabed, the method comprising the following steps:
  Bring the floating structure to be moored at the right location
  Collect the pull-in chain attached at the upper part of the elongated body of the connector
  Pull on the pull-in chain passing through the housing which is rigidly fixed to a part of the floating structure to be moored so that
    the elongated body of the connector is also pulled through the housing
    the rod of the connector body is pulled through the housing, the orientation pins provided on the rod automatically enters the guiding means integrated inside the housing
    the rod translates and rotates following the guiding means
    the orientation pins enter a non return location within the guiding means Once the pins are blocked in the guiding means, the connector body is locked and the pulling is stopped.

An embodiment of the present invention provides a method for disconnecting a mooring leg connector of a structure moored to the seabed, said connector having an elongated body extending in the mooring leg direction and a latch mechanism for fixation of the mooring leg to the structure moored and preventing movement in the direction of the seabed, the method comprising the following steps:

- Pull on the pull-in chain attached at the upper part of the elongated body up so that the orientation pins can enter the guiding means via a determined slot that will force the rod of the connector body to rotate
- By rotating and translating the rod, the orientation pins are following the cam system of the housing, until it exits the housing
- Lowering the pull-in chain to complete the disconnection and the pulling is stopped.

BRIEF DESCRIPTION OF THE DRAWINGS

The invention will be further described below in connection with exemplary embodiments with reference to the accompanying drawings, wherein.

DESCRIPTION OF THE PREFERRED EMBODIMENTS

Figure 1:
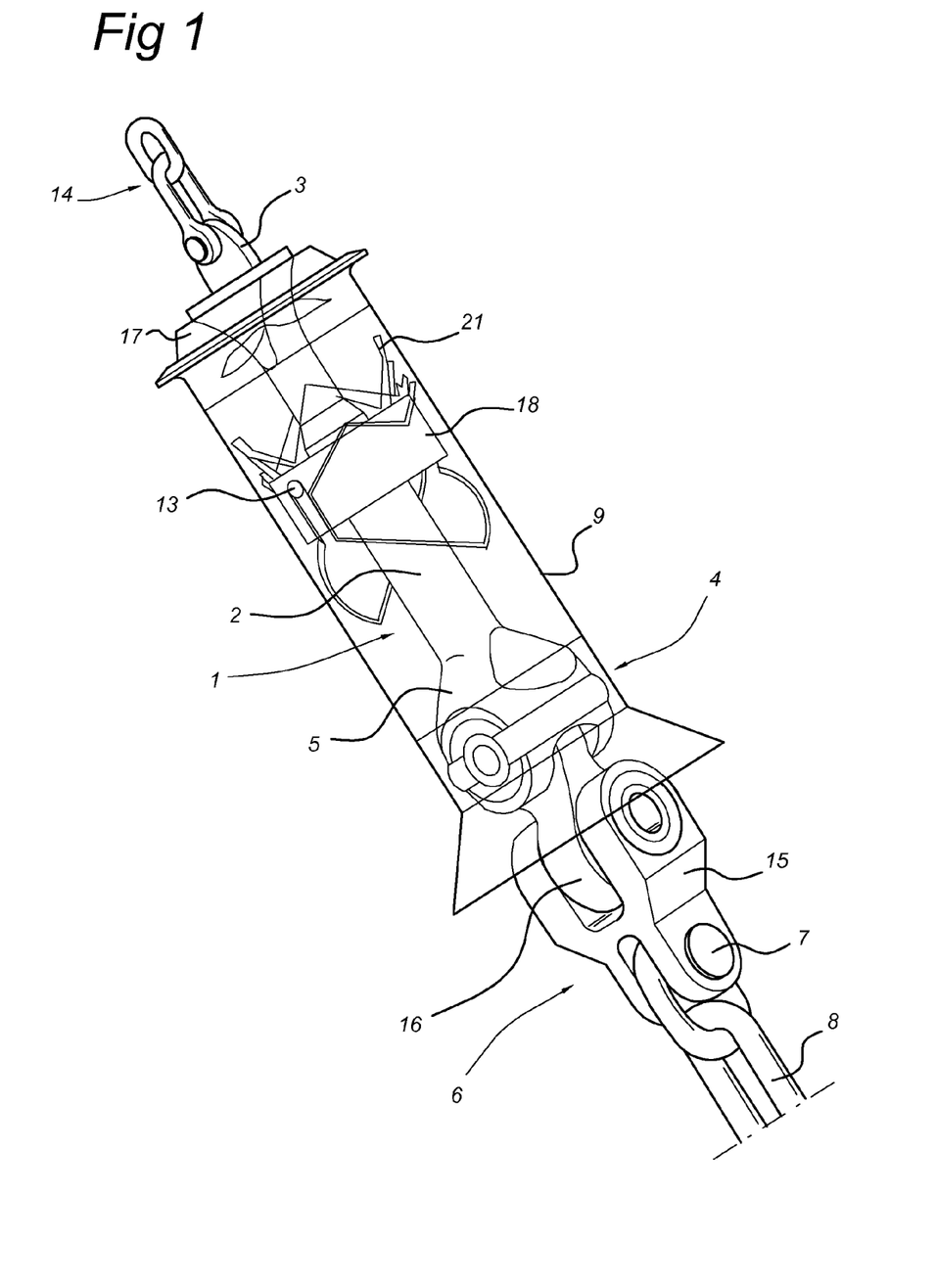
FIG. 1 shows a perspective view of the chain connector according to the present invention.
Figure 2:
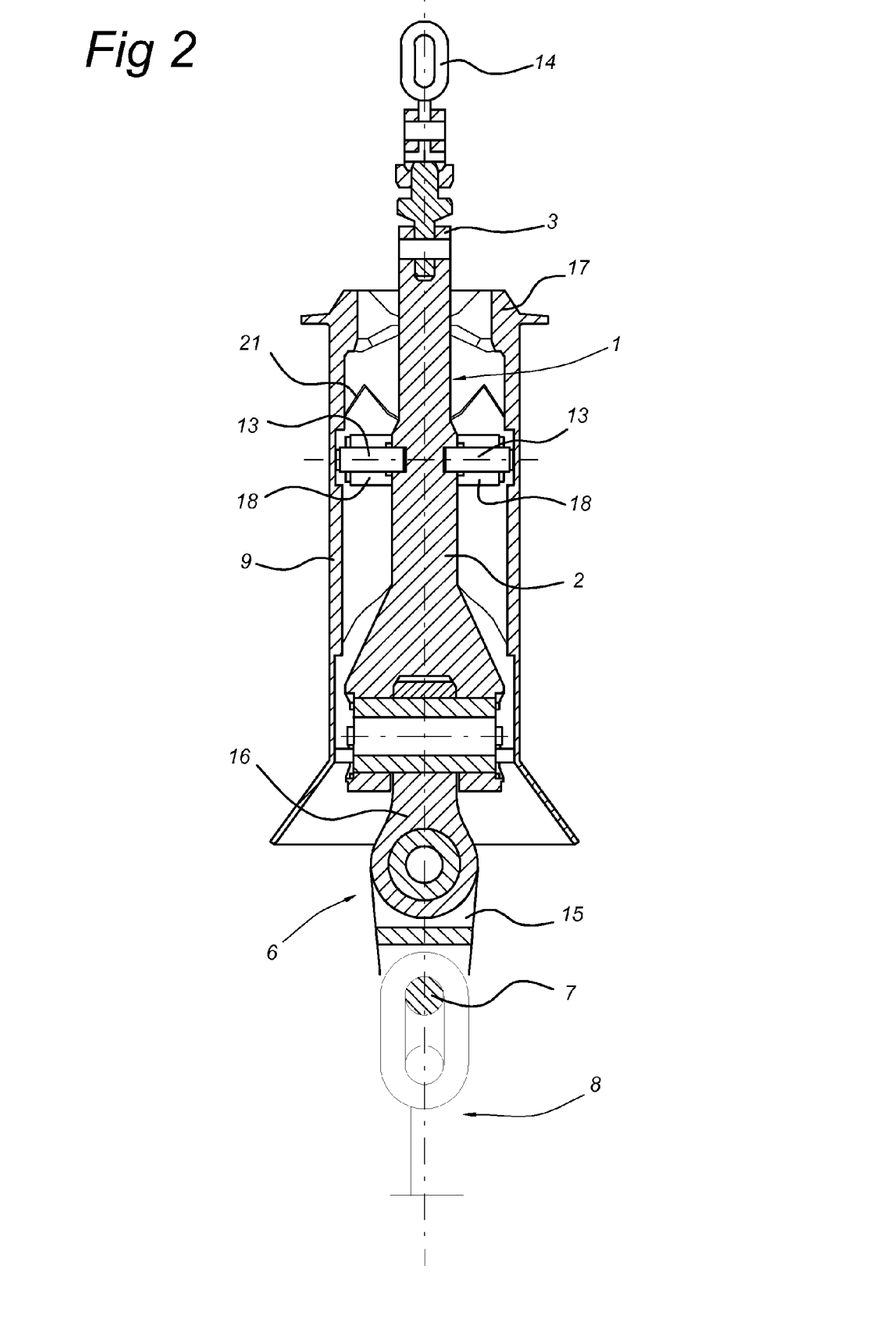
FIG. 2 shows a cross-sectional view of the connector according to the present invention.

FIG. 1 shows a perspective view of the chain connector according to the present invention and FIG. 2 shows cross-sectional view of the chain connector according to the present invention. In these figures, it appears clearly that the connector has an elongated body 1, received in a housing 9, with a broad head part 3 for attaching the pull-in chain 14, a tubular shaped middle part or rod 2 getting larger towards the bottom part 4, said bottom part comprising an enlargement 5 for engaging the flexible lower part 6 with a double articulation. The double articulation allows pivoting of the upper link of the mooring leg as would a unijoint. According to the present invention, the articulated part is located at the bottom of the connector body above the attachment member 7, where the mooring leg 8 is attached. The part 15 (or roll body) of the flexible lower part 6 'rolls' with regard to part 16 (or pitch body) which 'pitches' with respect to the rod 2; the latter is supported by the retaining ring 17 on the top of the housing 9 which is integrated into the chaintable of the structure to be moored.

The pitch articulation is mounted on the dedicated skirt support structure and the roll articulation is integrated in the pitch body 16 which makes the system compact. The role of the pitch body 16 is to permit the chain 8 to align with the tension in the pitch direction and then to prevent fatigue in chain. The pitch body 16 is therefore rotating relatively to the pitch axis of the chain connector.

Shafts are linked to the pitch and roll articulation (roll for lower shaft, pitch for upper shaft) through locking pins (not shown) that are at the interface between articulations and low friction items.

The rod 2 allows to get the required lever arm and to fix the upper chain segment 8 to the connector. The rod 2 is the center piece of the chain connector. Its role is to transfer the mooring load and to provide a system for the connection/disconnection of the chain connector. It is locked to the chain table by the retaining ring 17. As clearly shown in FIG. 1, the rod 2 is provided with a guiding ring 18. The guiding ring 18 ensures the centering of the rod 2 in the structure housing 9 during installation (through its diameter and its shape). The guiding ring is provided with orientation pins 13 that have the role of cam followers during the connection and the disconnection of the chain connector. They drive the rod in rotation during the connection and disconnection phases. In addition, the rod 2 is maintained in the chain guide with a tight fit at the bottom as clearly shown in FIG. 2.

The connector elongated body 1 is received in the through bone 20 of the housing 9. In a preferred embodiment, the housing 9 is integral or at least rigidly linked to a part of the structure to be moored. By having the housing 9 rigidly linked to the structure, as well as the pivoting axis at the bottom of the connector body 1, the fatigue failure and wear are very limited. In fact, the housing limits the movements of the rod 2 in the tangential direction and transfers the axial tension (coming from the retaining ring 17). It provides also the cam 21 to drive in rotation the rod 2 during connection and disconnection of the chain connector and the conical shape eases the entry of the rod 2 during installation.

The retaining ring 17 is an annular piece which locks the rod 2 in the vertical direction and transfers the load to load cells for monitoring the anchor line tension.

Figure 3:
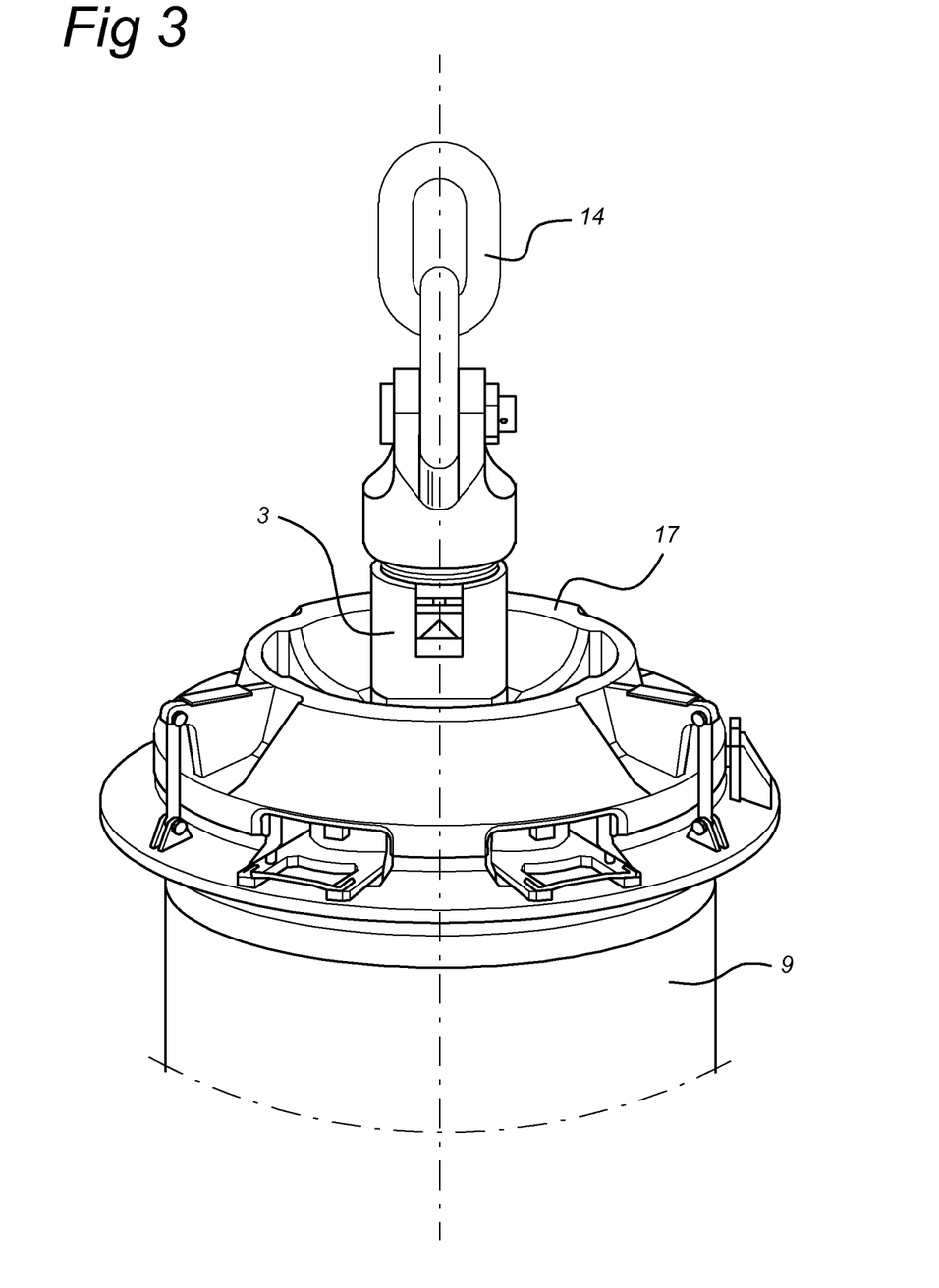
FIG. 3 shows the load cells located in the chain connector body interface.

The structure to be moored, according to one embodiment of the present invention, can comprise a floating platform unit provided with a mooring buoy and a mooring system having in total four bundles of five mooring lines 8 per bundle, which means that twenty chain connectors are mounted in the chain table at the bottom of the mooring buoy (i.e. in a permanently submerged position). Each of these chain connectors will be equipped with load cells as shown in FIG. 3. The anchor line tension for each of the twenty lines is monitored by incorporating four redundant load cells located in the chain connector body interface, so eighty load cells in total. Each load cell has an internal redundancy and is equipped with two connectors. The system is fully redundant meaning that the loss of one sensor does not impair the line tension measurement accuracy. The eighty load cells are connected to the floating platform unit through four stab plates (not shown). Each load cell is connected by two individual cables, routed through a pipe into the mooring buoy to the lower stab plate half. The cables are connected to the stab plate buoy side by mean of connectors. Each stab plate is equipped with ten connectors suitable for twenty wires each. Two connectors are dedicated by chain tension measurement; one connector for the four duty load cells and one connector for the four internal redundancies.

The load values are transmitted as digital signals. These signals are wired to the anchor leg load monitoring system.

All cabling must have an outer sheath highly resistant to mechanical damage, and be suitable for use in hazardous areas. The length of the cable shall permit the connection between the load cell in the chain connector and the lower stab plate on the buoy.

Figure 4A:
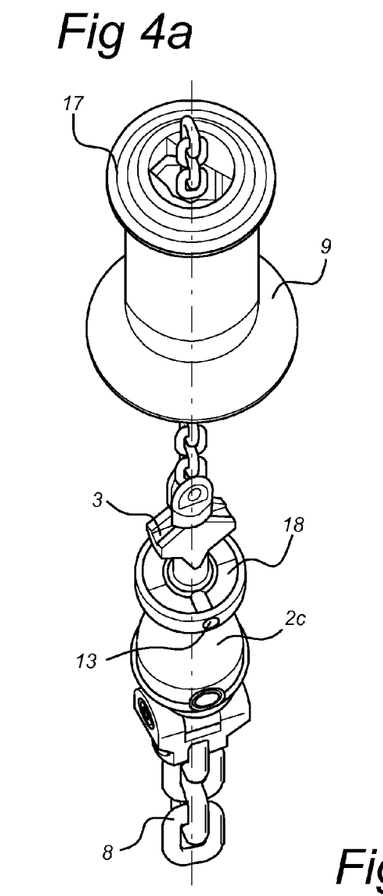
FIG. 4 shows the positions of the chain connector according to the present invention before and after connection and the development of the chain connector housing.
Figure 4B:
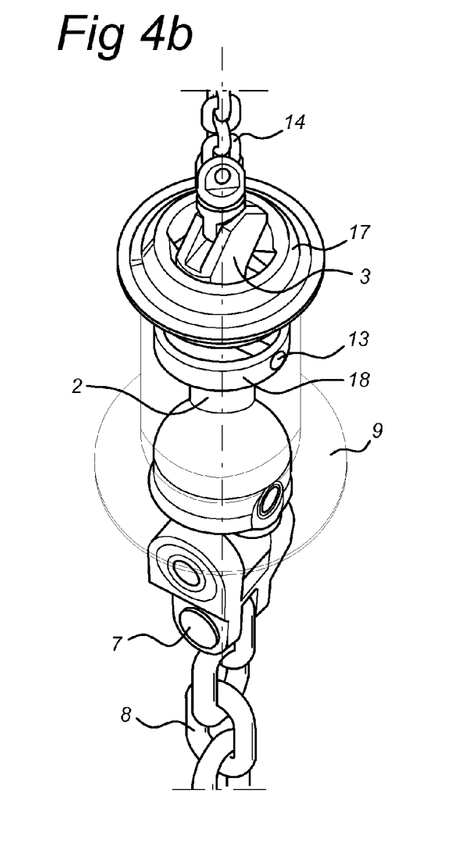
Figure 4C:
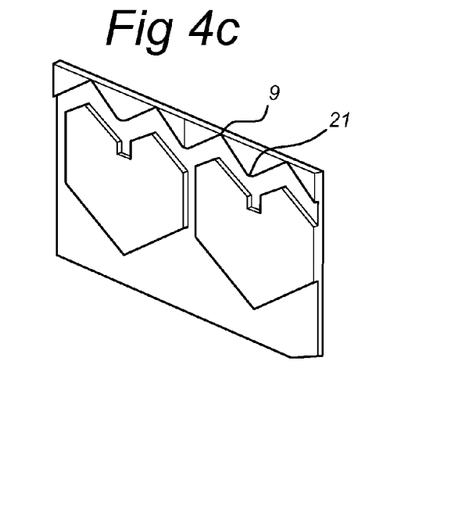
Figure 5A:
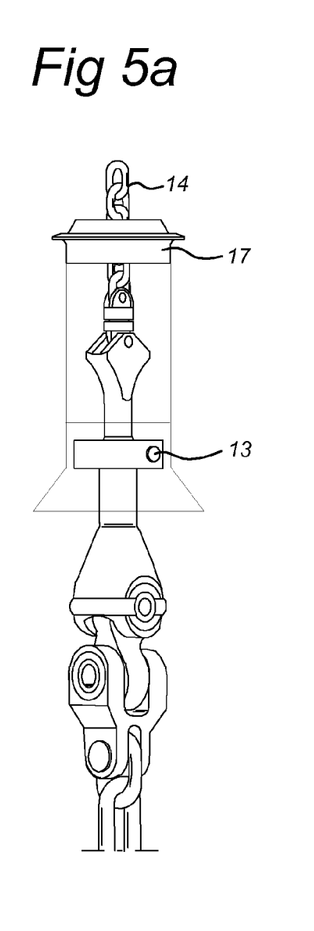
FIG. 5 shows the different steps of the connection of the chain connector by means of a system of cam and cam followers according to the present invention and the positions of the chain connector (orientation pins) with regards to the development of the receptacle (cam) during these different steps.
Figure 5B:
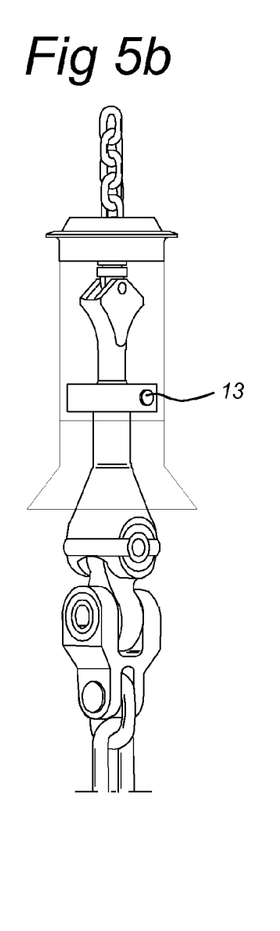
Figure 5C:
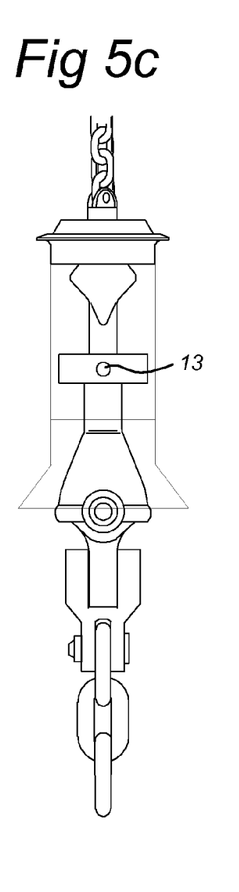
Figure 5D:
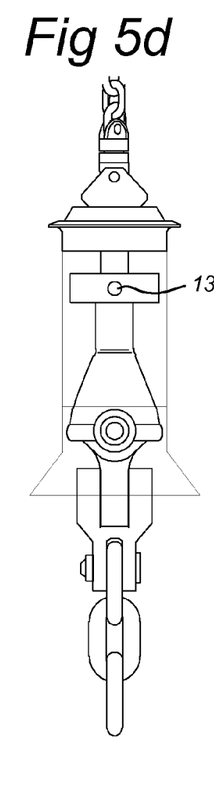
Figure 5E:
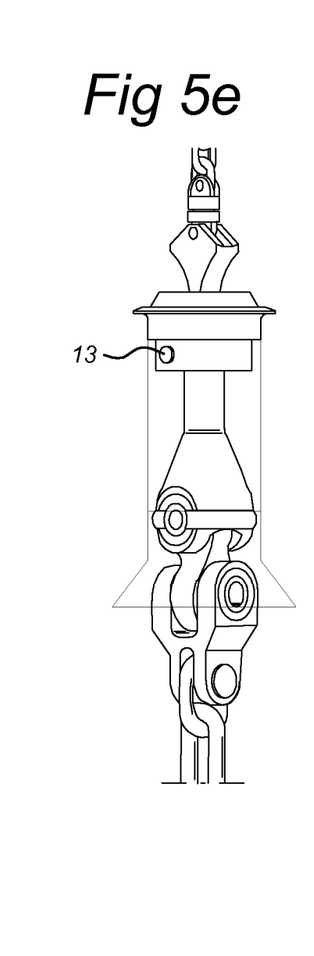
Figure 5F:
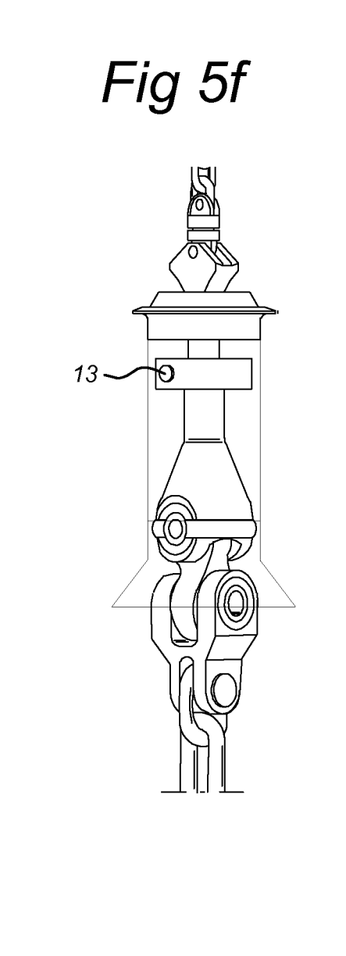
Figure 5G:
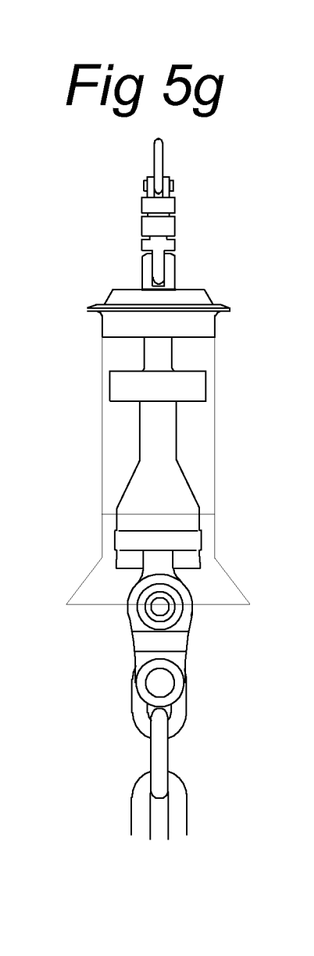
Figure 5H:
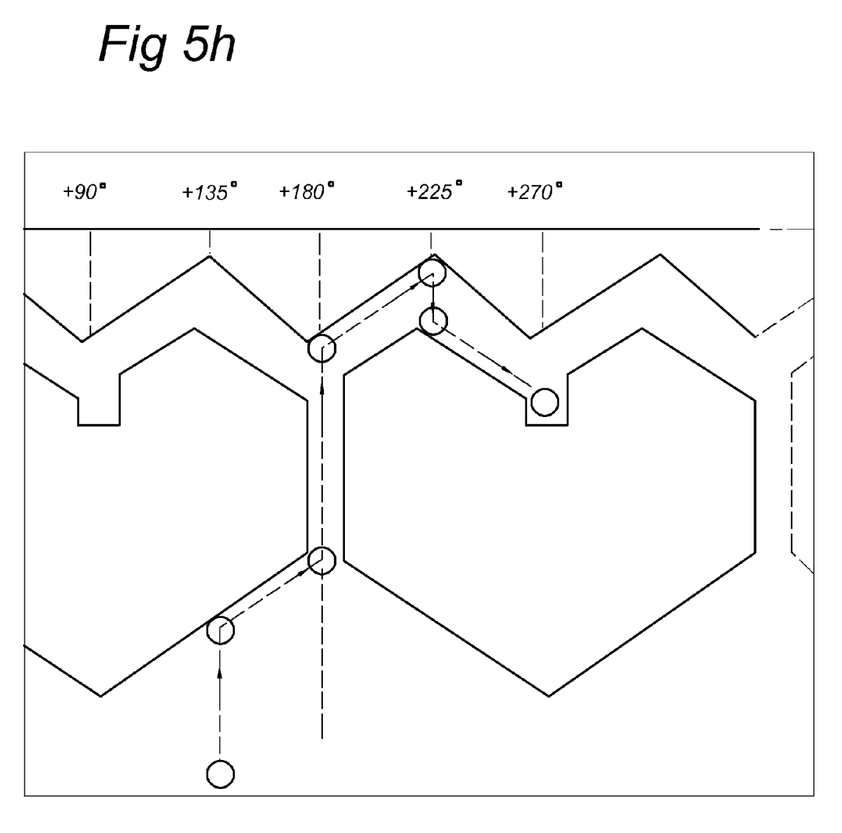
Figure 6A:
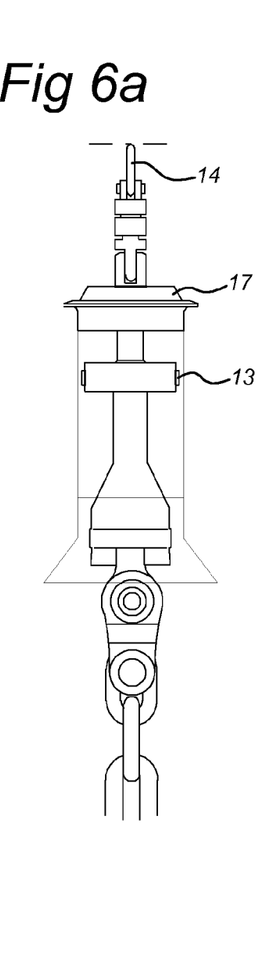
FIG. 6 shows the different steps of the disconnection of the chain connector by means of a system of cam and cam followers according to the present invention and the positions of the chain connector (orientation pins) with regards to the development of the receptacle (cam) during these different steps.
Figure 6B:
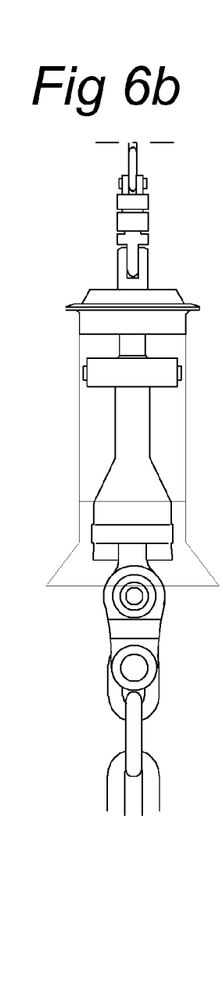
Figure 6C:
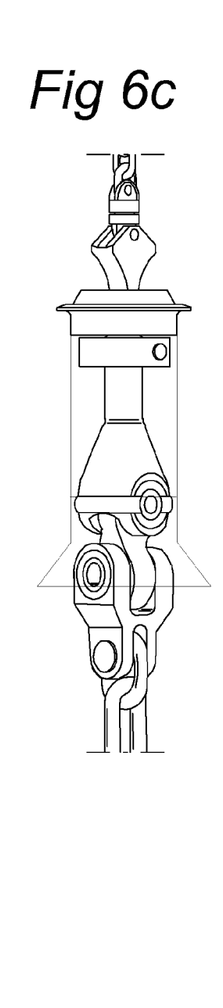
Figure 6D:
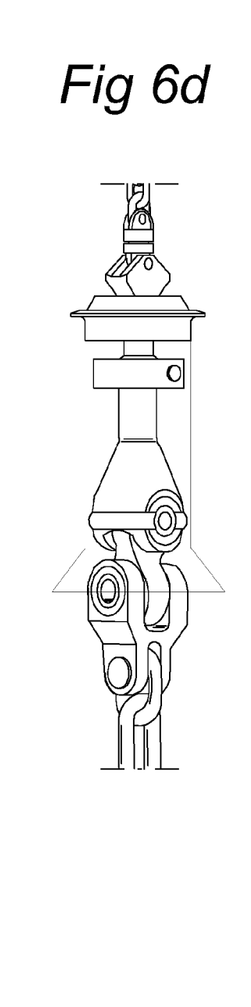
Figure 6E:
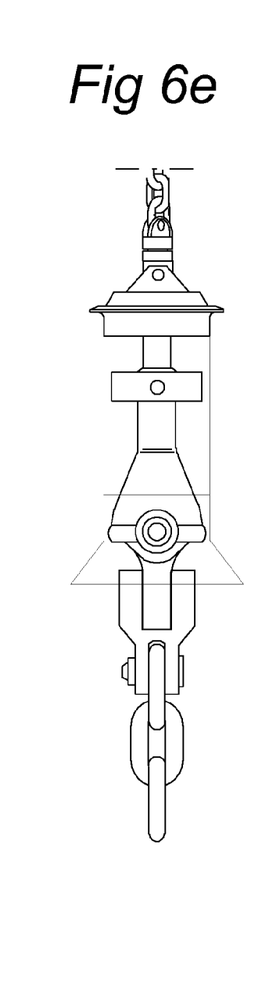
Figure 6F:
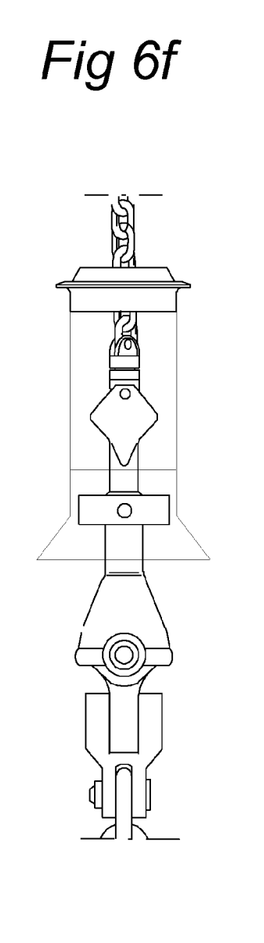
Figure 6G:
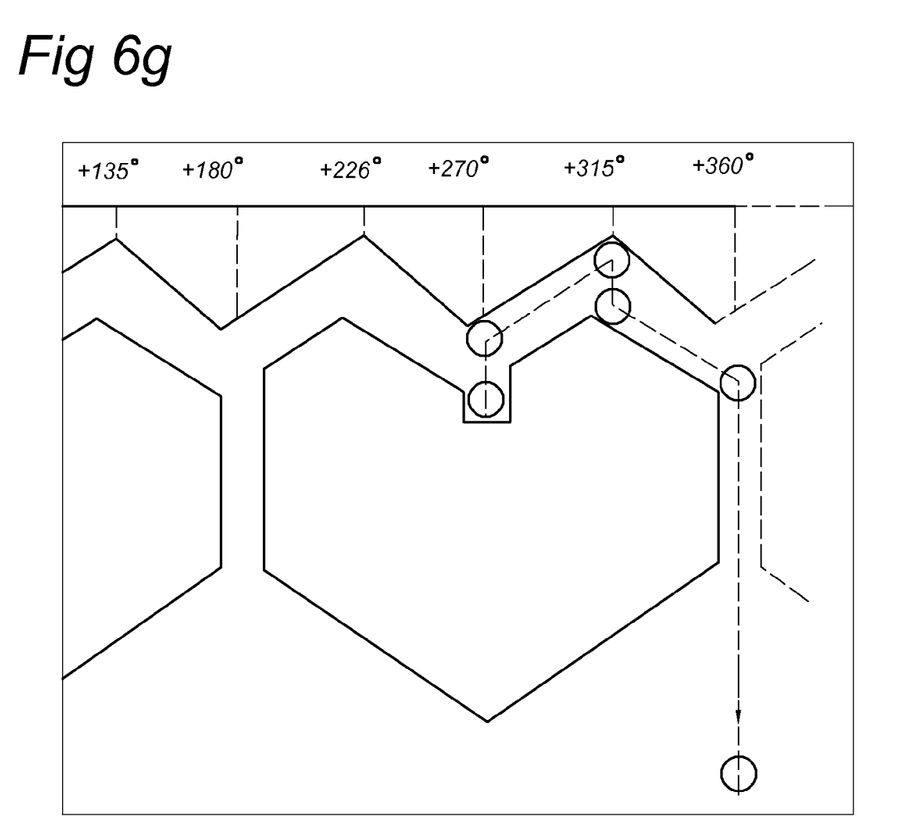

FIG. 4 shows the positions of the chain connector according to the present invention before and after connection and the development of the chain connector housing 9. It shows clearly the cam 21 integrated in the inside of the housing 9. The cam is driving the orientation pins 13 (or followers) provided on the guiding ring 18 of the rod 2. By pulling on the rod 2 (via pulling on the pull-in chain with a winch installed on the structure to be moored), the cam 21 causes the rod 2 rotate until the pins 13 go in position. There the pulling force is released and the mooring leg 8 is connected, the broad head part 3 resting on the retaining ring 17.

For disconnection, the connector's rod 2 is pulled again, and after another rotation of the rod 2, forced by the cam 21, the elongated body 1 of the connector is released.

The cam or guiding means 21, representing a helicoidal ramp inside the housing 9, has a shape designed to guide the pins 13 of the rod 2 and hence rotate the rod 2 so as to be properly aligned.

FIG. 5 shows the different steps of the connection of the chain connector by means of a system of cam 21 and cam followers 13 according to the present invention and the positions of the chain connector (orientation pins) with regards to the development of the receptacle (cam) during these different steps. The chain connector is connected only by pulling in (from step 1 to 5) and pulling out (in step 6 and 7) the pull-in chain 14.

In position 1, the chain 14 pulls the connector which is disconnected. In position 2 the orientation pins (followers) 13 come in contact with the housing 9 and the system of the cams 21 integrated on the inside of the housing 9. The orientation pins 13 follow the cam and the system (chain connector and mooring chain 8) translates upwards and rotates until the position 3. Between the positions 3 and 4, the system translates upwards without rotation, passing through the opening of the retaining ring 17. From the position 4 to the position 5 the system translates and rotates by 45°. In position 5 the pull-in chain 14 pull-out starts and the system translates downwards without rotation until the position 6. Between the position 6 and the last position 7 the system translates downwards and rotates by 45°. In the position 7 the connector is connected. During connection, the maximum rotation is equal to 180°.

FIG. 6 shows the different steps of the diverless disconnection of the chain connector by means of a system of cam and followers according to the present invention and the positions of the chain connector (orientation pins) with regards to the development of the receptacle (cam) during these different steps. The chain connector is disconnected only by pulling in (from step 1 to 3) and paying out (from step 4 to step 6) the pull-in chain 14. In position 1 the pull-in chain 14 pulls the chain connector which is connected. In position 2 the orientation pins 13 come in contact with the housing 9 and the system of cam 21 integrated on the inside of the housing 9. The system (chain connector and mooring chain 8) translates upwards and rotates by 45° until the position 3. In position 3, the pull-in chain 14 pull-out starts and the system translates downwards without rotation until the position 6. Between the positions 3 and 4, the system translates downwards without rotation. From position 4 to position 5, the system translates downwards and rotates by 45°. In position 5, the chain connector is orientated and can pass through the opening of the retaining ring 17. From position 5 to position 6 the system translates downwards without rotation and the mooring chain connector is disconnected. During disconnection, the maximum rotation is equal to 90°.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The invention claimed is:

1. A mooring leg connector for use with a mooring leg (8) extending up from the sea floor to connect a floating structure to be moored to the seabed wherein disconnection and connection of the mooring leg (8) is done by pulling in and out a connector elongated body (1) having a broad head part (3), the elongated body (1) extending in the mooring leg direction, said connector having a latch mechanism for fixation of the mooring leg (8) to the floating structure to be moored and preventing movement in the direction of the seabed, and a flexible part with a double articulation axis located at the bottom of the connector body (1) above the attachment member (7), the connector body (1) being received in a housing (9) which is fixed to a part of the structure to be moored, which housing (9) has at an upper end a retaining ring (17) having an opening through which the head part (3) can extend upward beyond said housing (9) in a first orientation and on which the head part (3) rests in a second orientation, wherein the latch mechanism comprises a guiding element (21) and followers or orientation pins (13) between the body (1) of the connector and the housing (9) for rotation of the elongate body (1) between the first and second positions.

2. A mooring leg connector as claimed in claim 1, wherein the connector comprises a rod (2) provided with orientation pins (13) that will engage with a guiding member (21), integrated inside the housing (9), forcing the rod (2) to rotate inside the housing (9) into a proper alignment and lock the connector body (1).

3. A mooring leg connector according to claim 1 wherein the elongated body (1) is fixed relative to the moored structure.

4. A mooring leg connector according to claim 1 wherein a pull-in line (14) is provided at the upper part (3) of the elongated body (1) to position the body (1) in the housing (9) and act on the body (1) for locking and unlocking.

5. A mooring leg connector according to claim 1 wherein the locking and unlocking of the connector is achieved by pulling in and out the pull-in line (14) attached to the top part (3) of the rod (2).

6. A mooring leg connector according to claim 1 wherein the connector is adapted for the retensioning of the mooring leg (8).

7. A mooring leg connector according to claim 1 wherein the connector is provided with a load monitoring device.

8. A mooring leg connector according to claim 7 wherein the connector is equipped with at least one load cell.

9. A mooring leg connector according to claim 1 wherein the elongated body (1) of the connector has, a cylindrically shaped middle part (2) with a broadened bottom part (4), said bottom part (4) comprising an enlargement (5) for engaging a flexible lower part (6) provided with a double articulation.

10. Floating platform unit provided with a mooring buoy and a mooring system comprising at least one bundle of mooring lines (8) wherein for each mooring line (8) there is mounted in the chain table at the bottom of the mooring buoy, a mooring leg connector according to claim 1.

* * * * *